Patented Nov. 10, 1931

1,830,859

UNITED STATES PATENT OFFICE

HERBERT SCHOTTE, OF BERLIN-REINICKENDORF, AND HANS PRIEWE, OF BERLIN-CHARLOTTENBURG, GERMANY, ASSIGNORS TO SCHERING-KAHLBAUM A. G., OF BERLIN, GERMANY

PROCESS FOR SEPARATING META-CRESOL FROM PHENOLIC MIXTURES

No Drawing. Application filed September 13, 1928, Serial No. 305,864, and in Germany September 14, 1927.

Our invention refers to the production of pure meta- and para-cresol.

A series of processes is known which attempt the particularly important technical separation of meta- and para-cresol from crude cresol, thus for example the separation by passing through the stages of the sulphonic acids, calcium or barium salts, oxalic esters etc. All these processes suffer from the fact that either the separation remains incomplete or the process is not economical.

In accordance with this invention on account of the different temperatures at which the double compounds of urea and the isomeric cresols are stable (see Kremann, Monatshefte f. Chemie 28 page 1125, 1907) a method is provided for the complete separation of the latter. This fact is particularly surprising since it would be expected that the urea compound would either be soluble in the excess of isomers or that the other components would impede the crystallization. The temperatures at which the crystalline meta-cresol-urea addition compound is stable are in fact scarcely affected by the presence of the other isomers. Only the upper temperature limit becomes somewhat lower.

The process of this invention is accordingly carried out by treating a mixture of meta- and para-cresols with urea and by separating the meta-cresol-urea addition compound. For this purpose 1 to 1.2 molecules of the calculated quantity of urea for the meta-isomer is sufficient. The process is effected either by dissolving the urea in the warmed mixture of cresols or by grinding the mixture with solid urea at ordinary temperature, when the compound formed from 1 molecule of urea and 1 molecule of meta-cresol crystallizes spontaneously, or better on seeding in white lustrous scales. From this addition compound the pure meta-cresol can be obtained in various ways for example by distillation if desired under reduced pressure, steam distillation, splitting with water or better with acid. Working under reduced pressure has the particular advantage that it allows of the recovery and further utilization of the urea.

From the remaining mother liquor, which contains the para-isomer in a very much purer condition, by fractional crystallization, the para-component can also be obtained pure.

The separation of the crystalline meta-cresol-urea compound is also effected by working in the presence of a suitable solvent such for example as carbon tetrachloride, xylol or the like, or water. It is true that large quantities of water decompose the addition compound, however, by treatment with concentrated urea solutions the crystalline meta-cresol-urea compound can also be obtained, the crystals of which are absolutely stable to a concentrated urea solution.

The following example illustrates the invention:

Example 100 kg. of a crude cresol which contains about 56% meta-cresol and in addition chiefly para-cresol are stirred with 35 kg. of commercial urea at a temperature which is brought in the course of several hours from a starting point of 40° C. to about −10° C.

The thick mass is centrifuged, the scaly crystalline urea meta-cresol compound is washed either with solvents such as carbon tetrachloride, xylol or the like, or with cold urea solution and split up with dilute mineral acids or solutions of magnesium sulphate, calcium chloride or sodium sulphate.

After, if necessary, further removing the small quantities of urea remaining in the meta-cresol by decomposition according to a customary method of hydrolysis there remains after distillation a 100% meta-cresol.

The cresol which runs off from the centrifuge and in which usually some urea is dissolved gives after removal of the urea in the above described manner and distillation a high percentage para-cresol which for purification needs only fractional crystallization in the cold. The para-cresol obtained is likewise 100%.

In an analogous manner meta-cresol can be removed from other mixtures containing the same by treatment with urea, and thus purified.

Various changes may be made in the details disclosed in the foregoing specification without departing from the invention or sacrificing the advantages thereof.

We claim:—

1. A process for the separating of pure meta-cresol from a phenolic mixture containing meta-cresol comprising treating the mixture containing meta-cresol with urea, separating the meta-cresol-urea addition compound, and recovering the meta-cresol compound.

2. A process for the separating of pure meta-cresol from a phenolic mixture containing meta- and para-cresol comprising treating the mixture with urea, separating the meta-cresol addition compound, and recovering the cresols from the separated portions.

3. A process for the separating of pure meta-cresol from a phenolic mixture containing meta-cresol comprising treating the mixture containing meta-cresol with urea in the presence of a solvent, separating the meta-cresol urea addition compound, and recovering the meta-cresol compound.

4. A process for the separating of pure meta-cresol from a phenolic mixture containing meta- and para-cresol comprising treating the mixture with urea in the presence of a solvent, separating the meta-cresol addition compound, and recovering the cresols from the separated portions.

5. A process for the separating of pure meta-cresol from crude cresol comprising treating the crude cresol with urea, allowing the pure meta-cresol-urea addition compound to crystallize, separating the crystals by centrifuging, decomposing the separated crystals by distillation, and recovering the para-cresol from the mother liquor.

HANS PRIEWE.
HERBERT SCHOTTE.